United States Patent [19]

Schroeder

[11] 4,192,349

[45] Mar. 11, 1980

[54] AIR CONDITIONING VALVE

[75] Inventor: Robert W. Schroeder, Malibu, Calif.

[73] Assignee: The United States of America as represented by the Secretary of the Army, Washington, D.C.

[21] Appl. No.: 931,794

[22] Filed: Aug. 7, 1978

[51] Int. Cl.² .................. F16K 3/02; F16K 11/02; F16K 35/02

[52] U.S. Cl. .................... 137/878; 137/625.45; 137/798; 137/887; 251/115; 251/149.2; 251/149.3; 251/300; 251/303; 244/129.4

[58] Field of Search ............. 137/625.18, 625.45, 137/625.46, 798, 878, 887; 251/115, 149.2, 149.3, 300, 301, 303; 244/129.4, 163

[56] References Cited

U.S. PATENT DOCUMENTS

| Re. 19,622 | 6/1935 | Goldsmith | 137/625.46 |
|---|---|---|---|
| 2,878,829 | 3/1959 | Folmsbee | 137/625.46 X |
| 2,907,502 | 10/1959 | Lang | 251/300 X |
| 3,109,457 | 11/1963 | Oliveau | 137/625.45 X |
| 3,272,471 | 9/1966 | McCullah | 251/146 |
| 3,426,984 | 2/1969 | Emmons | 244/117 |
| 3,436,039 | 4/1969 | Seger et al. | 244/129 |
| 3,572,356 | 3/1971 | Pinto | 137/81 |

Primary Examiner—Gerald A. Michalsky
Attorney, Agent, or Firm—William G. Gapcynski; Werten F. W. Bellamy; James T. Deaton

[57] ABSTRACT

A valve consisting of a rotating flapper type valve which covers an inlet and outlet opening in a missile base and being held open by the insertion of an inlet fitting of a supply duct into the valve for supplying conditioned air into a missile and the valve having spring means biasing it in the closed direction against the action of the supply duct and latch means which latches the flapper type valve in the closed position when said supply duct has been removed from the air inlet opening of the valve.

5 Claims, 5 Drawing Figures

AIR CONDITIONING VALVE

DEDICATORY CLAUSE

The invention described herein may be manufactured and used by or for the Government for governmental purposes without the payment of any royalty thereon.

BACKGROUND OF THE INVENTION

In the past, problems of supplying and/or exhausting air from a missile or compartment, where openings must be sealed during flight have arisen since most valves are such that the valve and/or duct must be externally disconnected or removed prior to or during missile launch. Also, if the missile is of high acceleration type, there may not be sufficient time for retraction or removal of the supply and/or exhaust duct during liftoff or closing of the valve during flight.

Therefore, it is an object of this invention to provide a valve assembly that does not require actuation motor or removal system to operate.

Another object of this invention is to provide a valve which is insensitive in operation to axial or lateral acceleration.

Still another object of this invention is to provide a fast acting valve assembly.

A still further object of this invention is to provide a high reliability and low cost valve due to the simplicity of the valve assembly.

Other objects and advantages of this invention will be obvious to those skilled in this art.

SUMMARY OF THE INVENTION

In accordance with this invention, a rotating flapper type valve for supplying conditioned air to a missile is provided that includes a base with an inlet port therethrough and an outlet port therethrough with a rotary flapper valve rotatably mounted relative to the base and biased against valve seats of the inlet and outlet ports by spring means that also biases the flapper valve in a closing direction. The valve is also provided with a latch that latches the rotary flapper valve in the closed position when said biasing means biases said rotary flapper valve to the closed position.

DESCRIPTION OF THE PREFERRED EMBODIMENT

Figure 1:
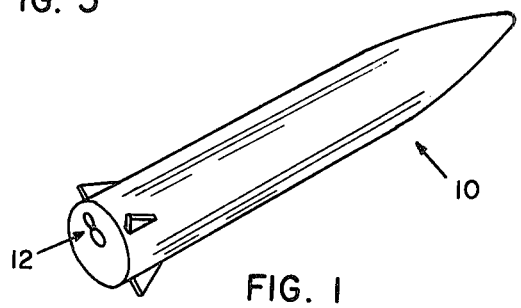
FIG. 1 is perspective view of a missile and illustrating the rotating flapper valve and end surface of the missile.

Referring now to the drawing, FIG. 1 shows a missile 10 with an air conditioning valve 12 illustrated schematically in accordance with this invention. The structure of air conditioning valve 12 is illustrated in FIGS. 2-5 and includes a base housing 14 that has an inlet port or opening 16 with a raised valve seat 18, and an outlet opening or port 20 with a raised valve seat 22. A rotating valve flapper cover 24 is rotatably mounted relative to base 14 by bolt interconnecting structure 26 and spring biasing means that includes springs 28 and 30 for biasing rotary flapper valve cover 24 against valve seats 18 and 22 and for biasing rotary flapper valve 24 in a closing direction or into the closed position. Spring 28 is a compression spring that biases against undersurface 31 of base 14 and surface 32 of member 34 that is keyed to bolt 26 to rotate in unison with bolt 26. Spring 30 is a torsion spring that biases the rotary flapper cover valve 24 in a closing direction with one end of spring 30 being connected to member 34 by bolt means 36 as illustrated in FIG. 5 and the other end connected to base 14 by bolt means 38. Bolt 26 has a head 40 that keys bolt 26 to rotary flapper valve 24.

Figure 2:
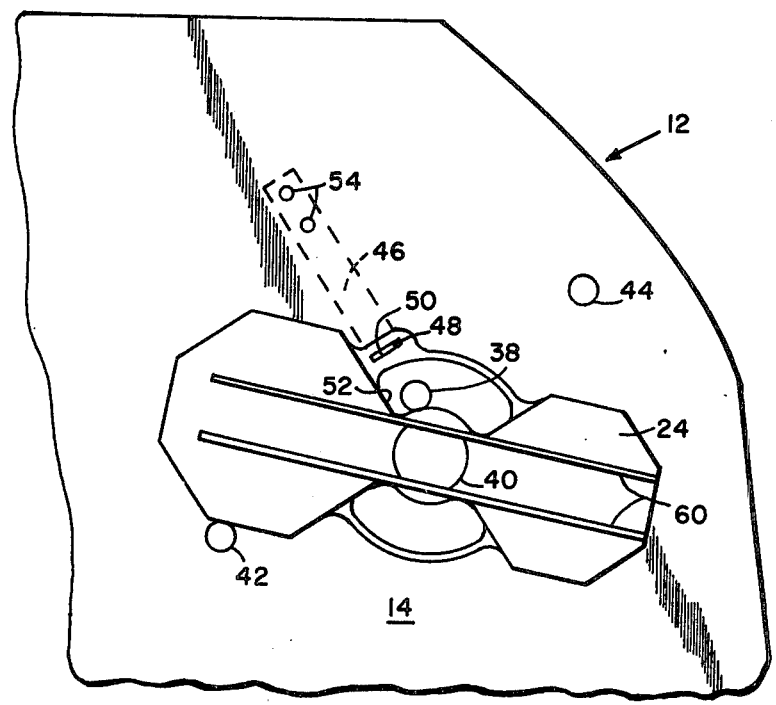
FIG. 2 is a top view of the valve illustrating the rotary flapper in a closed and latched position.

Base 14 also has stops 42 and 44 mounted thereon for limiting opening and closing movement of rotary flapper valve cover 24. The surface of rotary flapper valve cover 24 that cooperates with seats 18 and 22 is a flat planar surface. As illustrated in FIGS. 2 and 5, a flexible latch lever 46 has an end 48 that cooperates with and projects through rectangular opening 50 in base 14 to cooperate with surface 52 on the side of rotary flapper valve 24 to latch the rotary flapper valve in the closed position when biased there by torsion spring 30. Flexible latch lever 46 is secured to the undersurface of base 14 by conventional securing means 54. The undersurface of base 14 has a screen filter type device 56 mounted in a conventional manner relative to base 14 and around outlet opening 20 for filtering exhausted air.

Figure 4:
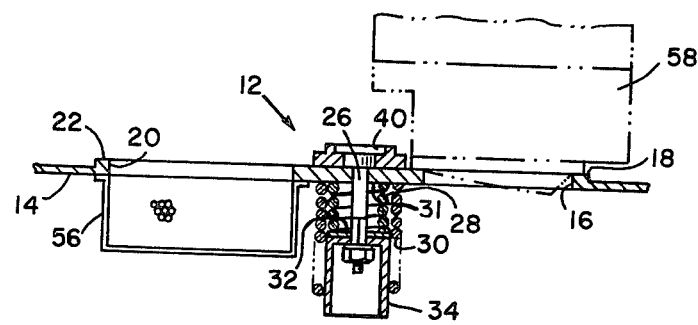
FIG. 4 is a sectional view of the rotary flapper valve taken along line 4—4 of FIG. 3 and also illustrating a remote supply duct in the inlet opening of the valve with the remote supply duct being illustrated in phantom.
Figure 5:
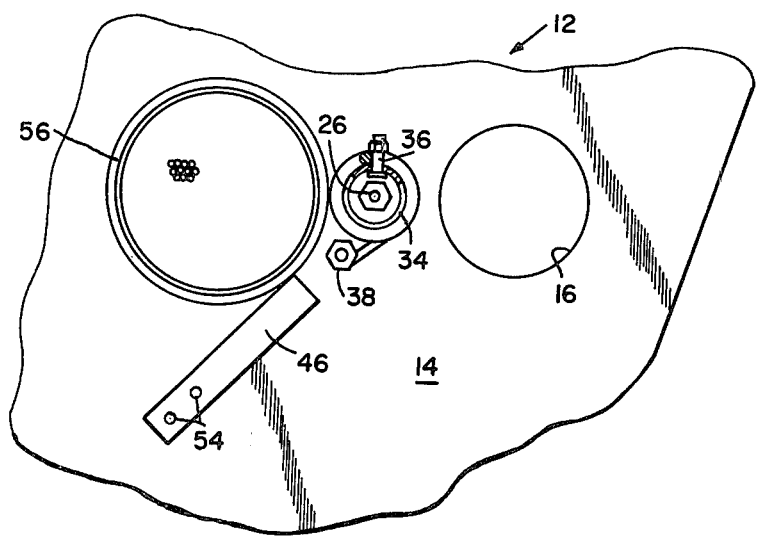
FIG. 5 is a bottom view of the air conditioning valve in accordance with this invention.

In FIG. 4, an air inlet duct 58 is illustrated in phantom to show how inlet port 16 cooperates with the air inlet duct when conditioned air is being supplied to missile 10. It is also pointed out that rotary flapper valve cover 24 has a pair of reinforcing ribs 60 which allows the rotary flapper valve cover to be made with a substantial structural support but with relatively light material.

Figure 3:
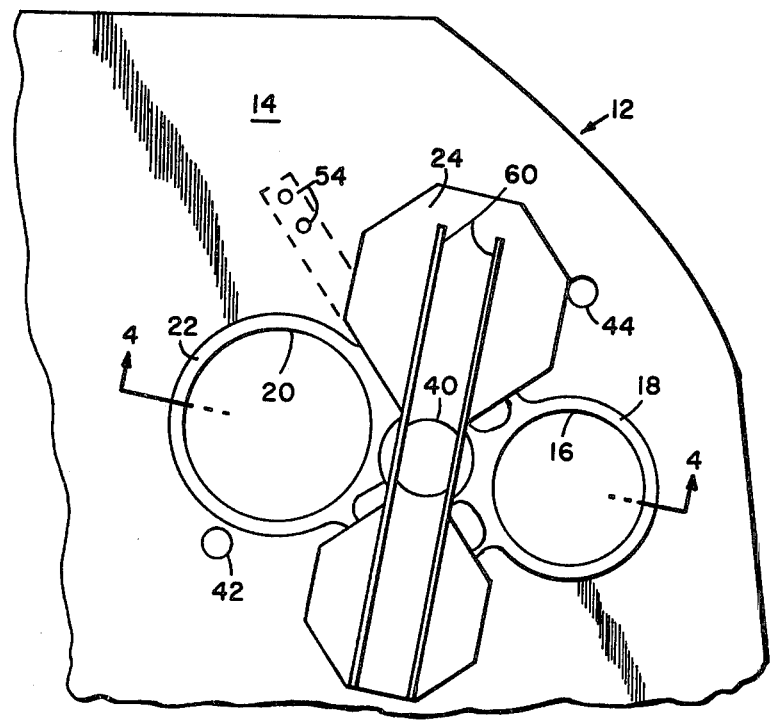
FIG. 3 is a top view illustrating the rotary flapper of the valve in an open position.

In operation, when it is desired to open rotary flapper valve 24, end 48 of detent 46 is depressed and rotary flapper valve 24 is manually rotated against the forces of springs 28 and 30 to the open position illustrated in FIG. 3. Then, supply air conditioning duct 58 can then be inserted into inlet opening 16 for the supply of conditioned air to missile 10. Upon liftoff or removal of supply duct 58, rotary flapper valve 28 is biased into the closed position by torsion spring 30 and latched in the closed position by end 48 of latch arm 46. Torsion spring 30 when biasing valve flapper 24 closed biases it into contact with stop 42.

I claim:

1. An air conditioning valve comprising: a relatively flat base with parallel inlet and outlet openings therethrough, and having valve seats therearound on one side; a rotary flapper valve cover pivotably mounted relative to said base and having means for covering and sealing said openings when in a closed position, said means for covering and sealing said openings being on opposite sides of and interconnected by structure which provides the pivotal mounting of said rotary flapper valve cover relative to said base, and said rotary flapper valve cover being rotatable to a position in which said inlet and outlet openings are each uncovered by said rotary flapper valve cover to allow fluid passage therethrough, said rotary flapper valve cover being pivotably mounted by a bolt means keyed to said valve cover and passing through an opening in said base, and biasing means connected between said base and said bolt means, said biasing means biasing said valve cover onto said valve seats and said valve cover in a closing direction.

2. An air conditioning valve as set forth in claim 1, wherein latch means is mounted on said base and blocks movement of said valve cover to an open position until said latch means is unlatched.

3. An air conditioning valve as set forth in claim 2, wherein said base has stop means mounted thereon for limiting rotary movement of said valve cover to and from open and closed positions.

4. An air conditioning valve as set forth in claim 3, wherein said biasing means includes a torsion spring connected at one end to said base and at the other end to said bolt means.

5. An air conditioning valve as set forth in claim 3, wherein said latch means includes a flexible member that has an end that projects through an opening in said base and into the path of rotary movement of said valve cover from the closed to the open position until said latch has been actuated to allow said valve cover to be rotated manually from the closed to an open position.

* * * * *